(12) United States Patent
Xie

(10) Patent No.: US 10,359,655 B2
(45) Date of Patent: Jul. 23, 2019

(54) LIQUID CRYSTAL PANEL WITH SWITCHABLE VISUAL ANGLE AND LIQUID CRYSTAL DISPLAY

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 198 days.

(21) Appl. No.: 15/125,178

(22) PCT Filed: Jul. 12, 2016

(86) PCT No.: PCT/CN2016/089779
§ 371 (c)(1),
(2) Date: Sep. 11, 2016

(87) PCT Pub. No.: WO2017/219403
PCT Pub. Date: Dec. 28, 2017

(65) Prior Publication Data
US 2018/0217418 A1    Aug. 2, 2018

(30) Foreign Application Priority Data
Jun. 25, 2016    (CN) .......................... 2016 1 0479688

(51) Int. Cl.
*G02F 1/13* (2006.01)
*G02F 1/1337* (2006.01)
*G02F 1/1343* (2006.01)

(52) U.S. Cl.
CPC ...... *G02F 1/1323* (2013.01); *G02F 1/133753* (2013.01); *G02F 1/134309* (2013.01);
(Continued)

(58) Field of Classification Search
CPC .. G02F 1/1323; G02F 1/134363; G02F 1/137; G02F 2001/134318;
(Continued)

(56) References Cited

U.S. PATENT DOCUMENTS

2007/0121047 A1* 5/2007 Chung ................. G02F 1/1323
349/141
2012/0013825 A1* 1/2012 Sugiura ................ G02F 1/1323
349/76

FOREIGN PATENT DOCUMENTS

CN    1892323 A    1/2007
CN    1991461 A    7/2007
(Continued)

*Primary Examiner* — Nathanael R Briggs
(74) *Attorney, Agent, or Firm* — Andrew C. Cheng

(57) ABSTRACT

The disclosure discloses a liquid crystal panel with a switchable visual angle, including a top substrate and a bottom substrate disposed opposite, and a liquid crystal layer between the top substrate and the bottom substrate. A surface of the top substrate opposite to the bottom substrate has a top visual angle electrode, a surface of the bottom substrate opposite to the top substrate has a bottom visual angle electrode. A length of the bottom visual angle electrode is shorter than a length of the top visual angle electrode. A center of the top visual angle electrode and a center of the bottom visual angle electrode are exactly opposite. The surface of the bottom substrate opposite to the top substrate further has two accessory electrodes corresponding to the top visual angle electrode. The two accessory electrodes are distributed on two sides of the bottom visual angle electrode symmetrically.

17 Claims, 3 Drawing Sheets

(52) U.S. Cl.
CPC ............... *G02F 1/134363* (2013.01); *G02F 2001/133761* (2013.01); *G02F 2001/134318* (2013.01); *G02F 2001/134345* (2013.01); *G02F 2001/134381* (2013.01); *G02F 2201/121* (2013.01); *G02F 2201/123* (2013.01)

(58) Field of Classification Search
CPC ........ G02F 2001/134345; G02F 2001/134381; G02F 2001/13706; G02F 2001/13712; G02F 2001/121; G02F 2201/121; G02F 2201/123
See application file for complete search history.

(56) References Cited

FOREIGN PATENT DOCUMENTS

| | | |
|---|---|---|
| CN | 1991466 A | 7/2007 |
| CN | 101097316 A | 1/2008 |
| CN | 100495136 C | 6/2009 |
| CN | 101498869 A | 8/2009 |
| CN | 103852939 A | 6/2014 |
| CN | 104460138 A | 3/2015 |
| JP | 2011027951 A | 2/2011 |

\* cited by examiner

LIQUID CRYSTAL PANEL WITH SWITCHABLE VISUAL ANGLE AND LIQUID CRYSTAL DISPLAY

CROSS REFERENCE

This disclosure claims priority to Chinese patent application No. 201610479688.5, entitled "LIQUID CRYSTAL PANEL WITH SWITCHABLE VISUAL ANGLE AND LIQUID CRYSTAL DISPLAY" filed on Jun. 25, 2016, which is incorporated by reference in its entirety.

FIELD OF THE DISCLOSURE

The disclosure relates to a liquid crystal manufacture technical field, and more particularly to a liquid crystal panel with a switchable visual angle and a liquid crystal display.

BACKGROUND OF THE DISCLOSURE

Demands for quality and humanization design of a product are increasing with popularity of mobile and applicable devices utilizing liquid crystal displays. A range of visual angle is a critical performance index of a liquid crystal display panel. The liquid crystal display panel changes polarization of rays by adjusting arrangement of liquid crystal molecules to control the amount of passed light between a top and a bottom polarized layers for a function in display. Although a conventional liquid crystal display panel is developing towards a wide angle, under certain circumstances, the liquid crystal display panel also needs a switch function between a wide angle and a narrow angle. For instance, a user needs to share an image displayed by a portable electric device sometimes, in other cases, a user trends not to show an image displayed due to personal security. A display that can switch a wide angle to a narrow angle and vice versa is in need to satisfy the two requirements.

In a conventional technique, switch of the wide angle and the narrow angle of a display panel is practically manipulated by switching of horizontal alignment and vertical alignment of liquid crystal molecules. For instance, when the liquid crystal molecules are positive liquid crystals, a visual angle is controlled by an electrode. When a control electrode is loaded with a voltage, a vertical electric field will emerge, the horizontal alignment liquid crystals rotate 90 degrees to be vertical in the electric field. However, as a structure of liquid crystal molecule is a stick, the liquid crystals can rotate at any angle, one end or the other. Therefore, the liquid crystals can disturb each other during rotation and cause a chaos, as a result, the response to switch visual angles is slow and symmetry of the visual angle is poor after switching angles.

SUMMARY OF THE DISCLOSURE

Technical problems to be solved by the disclosure are problems such as during switching a wide angle and a narrow angle of a liquid crystal display panel in a conventional technique, a chaos occurs due to various rotation directions of liquid crystal molecules, and long response time caused by disturbance of liquid crystal molecules rotation, resulting in an asymmetrical visual angle.

To solve the technical problems above, the disclosure provides a liquid crystal panel with a switchable visual angle. The liquid crystal panel includes a top substrate and a bottom substrate disposed opposite, and a liquid crystal layer between the top substrate and the bottom substrate. A surface of the top substrate opposite to the bottom substrate has a top visual angle electrode, a surface of the bottom substrate opposite to the top substrate has a bottom visual angle electrode. A length of the bottom visual angle electrode is shorter than a length of the top visual angle electrode. A center of the top visual angle electrode and a center of the bottom visual angle electrode are exactly opposite. The surface of the bottom substrate opposite to the top substrate further has two accessory electrodes corresponding to the top visual angle electrode. The two accessory electrodes are distributed on two sides of the bottom visual angle electrode symmetrically. The top visual angle electrode fully covers projections of the accessory electrodes on the top substrate.

The surface of the bottom substrate opposite to the top substrate further has pixel electrodes and common electrodes disposed alternately. The pixel electrodes and the common electrodes are located at a side of the accessory electrodes away from the bottom visual angle electrode. A difference of the length of top visual angle electrode and the length of the bottom visual angle electrode is four times longer than a distance between one of the pixel electrodes and an adjacent common electrode.

A distance of the accessary electrodes and two ends of the bottom visual angle electrode is equal to the distance between one of the pixel electrodes and an adjacent common electrode.

Shapes and sizes of the accessary electrodes, the pixel electrodes and the common electrodes are the same.

The pixel electrodes, the common electrodes, the top visual angle electrode, the bottom visual angle electrode and the accessary electrodes are made with transparent conductive material.

The liquid crystal molecules between the pixel electrodes and the common electrodes rotate on a plane paralleled the top substrate and the bottom substrate. The liquid crystal molecules between the top visual angle electrode and the bottom visual angle electrode, the accessary electrodes rotate in a plane perpendicular to the top substrate and the bottom substrate.

The liquid crystal molecules between the top visual angle electrode and the bottom visual angle electrode, the accessary electrodes are positive liquid crystals with originally horizontal arrangement during unloaded with a voltage.

The liquid crystal molecules between the top visual angle electrode and the bottom visual angle electrode, the accessary electrodes are negative liquid crystals with originally vertical arrangement during unloaded with a voltage.

The disclosure further provides a liquid crystal display. The liquid crystal display includes a backlight module, a driving circuit and a liquid crystal panel with a switchable visual angle. The driving circuit controls the backlight module and the liquid crystal panel to operate. The backlight module provides a backlight source to display an image by the liquid crystal panel.

The liquid crystal panel with a switchable visual angle includes a top substrate and a bottom substrate disposed opposite, and a liquid crystal layer between the top substrate and the bottom substrate. A surface of the top substrate opposite to the bottom substrate has a top visual angle electrode, a surface of the bottom substrate opposite to the top substrate has a bottom visual angle electrode. A length of the bottom visual angle electrode is shorter than a length of the top visual angle electrode. A center of the top visual angle electrode and a center of the bottom visual angle electrode are exactly opposite. The surface of the bottom substrate opposite to the top substrate further has two accessory electrodes corresponding to the top visual angle electrode. The two accessory electrodes are distributed on two sides of the bottom visual angle electrode symmetrically. The top visual angle electrode fully covers projections of the accessory electrodes on the top substrate.

The surface of the bottom substrate opposite to the top substrate further has pixel electrodes and common electrodes disposed alternately. The pixel electrodes and the common electrodes are located at a side of the accessory electrodes away from the bottom visual angle electrode. A difference of the length of top visual angle electrode and the length of the bottom visual angle electrode is four times longer than a distance between one of the pixel electrodes and an adjacent common electrode.

A distance of the accessary electrodes and two ends of the bottom visual angle electrode is equal to the distance between one of the pixel electrodes and an adjacent common electrode.

Shapes and sizes of the accessary electrodes, the pixel electrodes and the common electrodes are the same.

The pixel electrodes, the common electrodes, the top visual angle electrode, the bottom visual angle electrode and the accessary electrodes are made with transparent conductive material.

The driving circuit includes a first display driver and a second display driver. The first display driver controls voltages of the pixel electrodes and the common electrodes, the second display driver controls voltages of the top visual angle electrode, the bottom visual angle electrode and the accessary electrodes.

Advantageous effects of the disclosure are as follows. A wide angle mode and a narrow angle mode of the liquid crystal panel can be switched by controlling the bias voltage for changing arrangement of the liquid crystal molecules, various requirements of the liquid crystal display can be fulfilled. The design is the bottom visual angle electrode is shorter than the top visual angle electrode, and two accessary electrodes are disposed on the two sides of the bottom visual angle electrode shorter than the top visual angle electrode. When the electrodes are loaded with the bias voltage. A tilt electric field is generated between two sides of the top visual angle electrode, two sides of the bottom visual angle electrode and the accessary electrodes. The tilt electric field leads to the liquid crystal molecules located at two ends of a subpixel region to rotate along one direction in the tilt electric field, and adjacent liquid crystal molecules are spurred to rotate from the same end gradually in sequence. Disturbance of the liquid crystal molecules can be prevented and response time for switching angles can be reduced, symmetry of the visual angle after being switched can be improved.

BRIEF DESCRIPTION OF THE DRAWINGS

In order to more clearly illustrate embodiments of the disclosure or prior art, following figures described in embodiments or prior art will be briefly introduced, it is obvious that the drawings are merely some embodiments of the disclosure, a person skilled in the art can obtain other figures according to these figures without creativity.

DETAILED DESCRIPTION OF PREFERRED EMBODIMENTS

Embodiments of the disclosure are described in detail with reference to the accompanying drawings as follows, obviously, the described embodiments are part of embodiments of the disclosure rather than all of them. Based on the embodiments of the disclosure, all other embodiments obtained by a person skilled in the art without creativity should be considered within the scope of protection of the disclosure.

Figure 1:
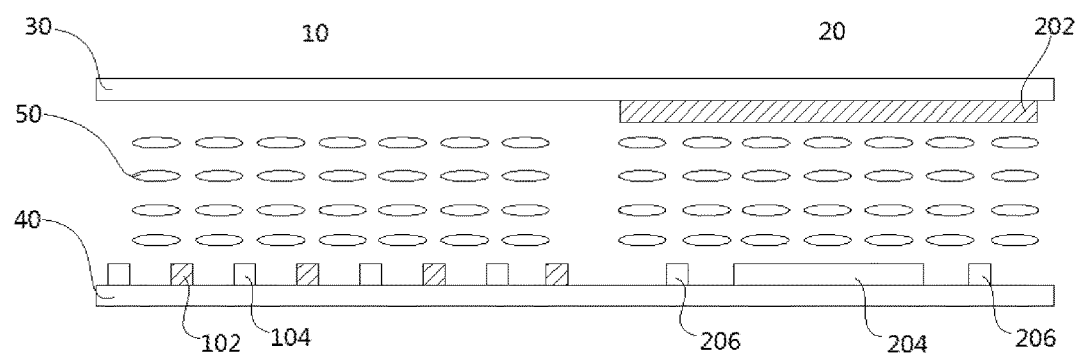
FIG. 1 is a schematic structural view of a liquid crystal panel with a switchable visual angle provided by a first embodiment of the disclosure.

FIG. 1 is a schematic structural view of a liquid crystal panel with a switchable visual angle provided by a first embodiment of the disclosure. As shown in the figure, the liquid crystal panel with a switchable visual angle includes a top substrate 30, a bottom substrate 40 and liquid crystal molecules 50 in between. The crystal molecules 50 are positive liquid crystals. A pixel area of the liquid crystal panel is divided into a main pixel region 10 and a sub pixel region 20 according to various distributions of electrodes. Pixel electrodes 102 and common electrodes 104 are disposed alternately on the bottom substrate 40 of the main pixel region 10. The main pixel region is horizontal alignment, the liquid crystal molecules 50 can merely rotate on a plane paralleled the top substrate 30 and the bottom substrate 40 in the main pixel region, working on an in-plane switching (IPS) mode. The liquid crystal molecules 50 of the main pixel region 10 will not rotate without a voltage. As polarization directions of two polarizers in front and rear of the liquid crystal panel are perpendicular, a polarization direction of backlight provided by a backlight module of the display will not be changed after penetrating the rear polarizer, for which cannot penetrate the front polarizer, the liquid crystal display panel can only display relatively pure black. The liquid crystal molecules rotate with a voltage, horizontally polarized light is switched to be vertically polarized light, and the backlight can penetrate. The amount of polarized light is controlled by the electric field applied on two sides of the liquid crystal molecules 50 to obtain required light. The IPS operational mode of the main pixel region improves the visual angle by in-plane switching. Altering thickness of space, frictional strength and horizontal electric field driving to rotate the liquid crystal molecules 50 to the maximum angle for a wider angle, with an advantage of increasing the visual angle. An extra offset film is unnecessary to be added during manufacture of the liquid crystal panel, the visual display is relatively excellent, and colors are vivid.

The sub pixel region 20 includes a top visual angle electrode 202, a bottom visual angle electrode 204 and accessary electrodes 206. The top visual angle electrode 202 and the bottom visual angle electrode 204 are disposed on the top substrate 30 and the bottom substrate 40 correspondingly. A center of a projection of the top visual angle electrode 202 on the top substrate 30 is coincided with a center of a projection of the bottom visual angle electrode 204 on the top substrate 30. The top visual angle electrode 202 and the bottom visual angle electrode 204 are symmetrical with respect to a central line of the sub pixel region 20, the two accessary electrodes 206 are disposed on the bottom substrate 40, on two sides of the bottom visual angle electrode 204. Distances of the two accessary electrodes 206 and two ends of the bottom visual angle electrode 204 are equal. The pixel electrodes 102, the common electrodes 104, the top visual angle electrode 202, the bottom visual angle electrode 204 and the accessary electrodes 206 are all made with transparent conductive material. The material will not affect backlight to penetrate the liquid crystal panel to display an image. Preferably, shapes and sizes of the accessary electrodes 206, the pixel electrodes 102 and the common electrodes 104 are the same, the three sorts of electrodes can be manufactured in a same process, the process can be simplified and costs can be reduced. In an embodiment, a distance of the accessary electrodes 206 and two ends of the bottom visual angle electrode 204 is equal to the distance between one of the pixel electrodes 102 and an adjacent common electrode 104. And a distance of a projection of the accessary electrodes 206 on the top substrate 30 and an end of the projection of the top visual angle electrode 202 on the top substrate 30 is equal to a distance of one of the pixel electrodes 102 and an adjacent common electrode 104, which means a difference of the length of the top visual angle electrode 202 and that of the bottom visual angle electrode 204 is twice the distance of one of the pixel electrodes 102 and an adjacent common electrode 104. And the accessary electrodes 206 is located at a central point of the length. The embodiment is benefit for obtaining a homogeneous and symmetrical tilt electric field on two ends of the sub pixel region 20 when the sub pixel region 20 is loaded with a bias voltage subsequently.

Figure 2:
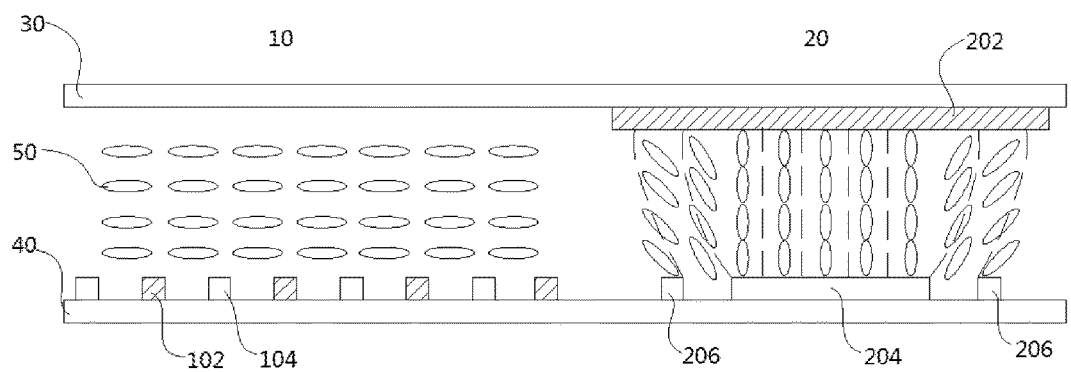
FIG. 2 is an operational principal view of the liquid crystal panel with a switchable visual angle provided by the first embodiment of the disclosure.
Figure 3:
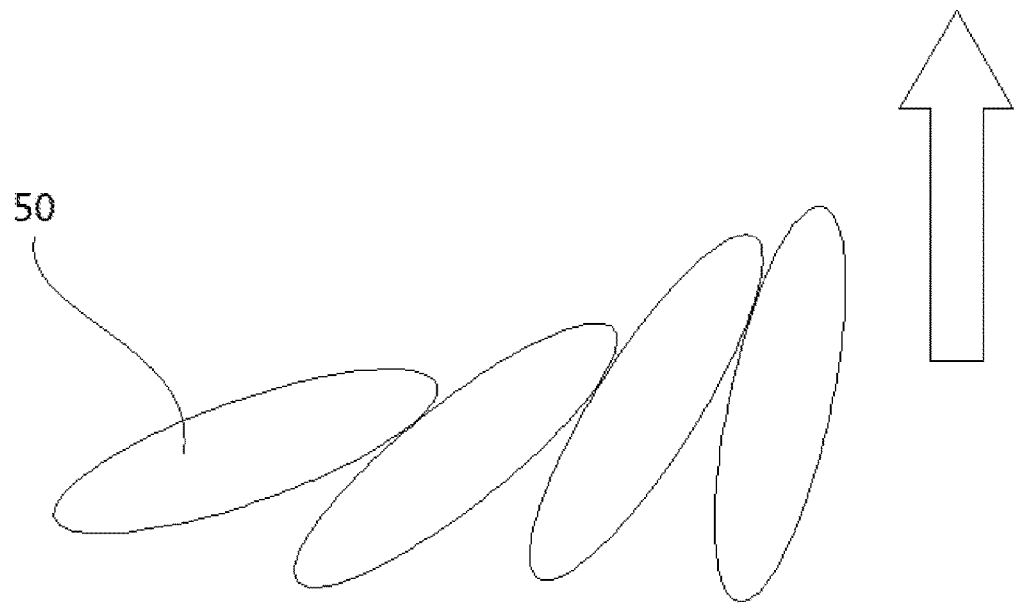
FIG. 3 is a principal view of liquid crystal rotation of a subpixel region of the liquid crystal panel with a switchable visual angle provided by the first embodiment of the disclosure.

FIG. 2 is an operational principal view of the liquid crystal panel with a switchable visual angle provided by the first embodiment of the disclosure. As shown in the figure combined with FIG. 1, when the top visual angle electrode 202, the bottom visual angle electrode 204 and the accessary electrodes 206 are unloaded with a bias voltage, the liquid crystal molecules 50 of the sub pixel region 20 are horizontal, the backlight penetrates the liquid crystal molecules 50 of the sub pixel region 20 to display an image, the sub pixel region 20 and the main pixel region 10 work simultaneously, the liquid crystal panel is on wide angle display mode. After the top visual angle electrode 202, the bottom visual angle electrode 204 and the accessary electrodes 206 are loaded with the bias voltage, a tilt electric field emerges between the accessary electrodes 206, the two ends of the bottom visual angle electrode 204 and two ends of the top visual angle electrode 202. The liquid crystal molecules 50 on two sides of the sub pixel region 20 firstly rotate along a direction parallel a tilt electric field line 64 to be vertical affected by the tilt electric field, and the adjacent liquid crystal molecules 50 are spurred to rotate from the same end gradually in sequence to be vertical. Finally all the liquid crystal molecules 50 are vertical, parallel a vertical electric field line 62. Combined with FIG. 3, liquid crystal molecules on right side of the sub pixel region 20 will be taken as an example, the liquid crystal molecules 50 on the outmost side rotate from horizon to be parallel the tilt electric field line 64 counterclockwise affected by the tilt electric field, along with the influence of the vertical electric field, the adjacent liquid crystal molecules 50 are spurred to rotate from the same end gradually in sequence to be vertical. When all the liquid crystal molecules 50 of the sub pixel region 20 are vertical, the backlight penetrates gaps among the liquid crystal molecules 50, the sub pixel region 20 leaks light, only the main pixel region 10 displays, the liquid crystal panel is on narrow visual angle display mode.

A tilt electric field is generated between the two ends of the top visual angle electrode 202, two ends of the bottom visual angle electrode 204 and the accessary electrodes 206. The tilt electric field leads the liquid crystal molecules 50 on two sides of the sub pixel region 20 to first rotate along a same direction affected by the tilt electric field. And the adjacent liquid crystal molecules 50 are spurred to rotate from the same end gradually in sequence to be vertical. Disturbance of the liquid crystal molecules can be prevented during switching the wide angle display mode and the narrow angle display mode, and response time for switching angles can be reduced, symmetry of the visual angle after being switched can be improved.

Figure 4:
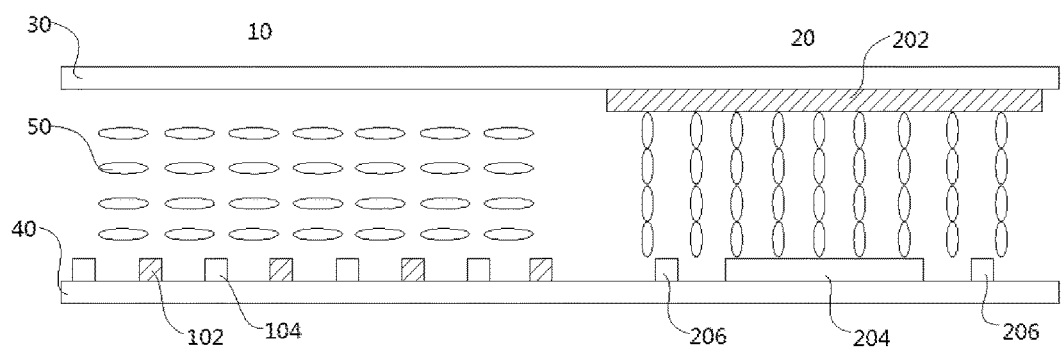
FIG. 4 is a schematic structural view of a liquid crystal panel with a switchable visual angle provided by a second embodiment of the disclosure.
Figure 5:
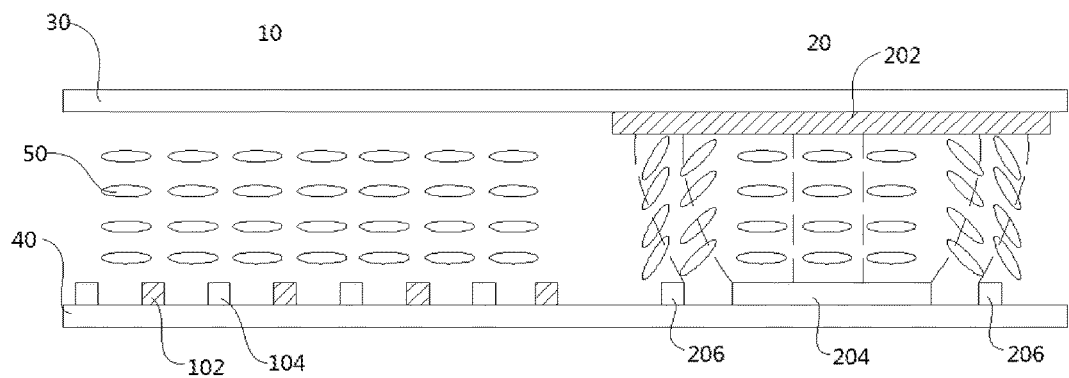
FIG. 5 is an operational principal view of the liquid crystal panel with a switchable visual angle provided by the second embodiment of the disclosure.
Figure 6:
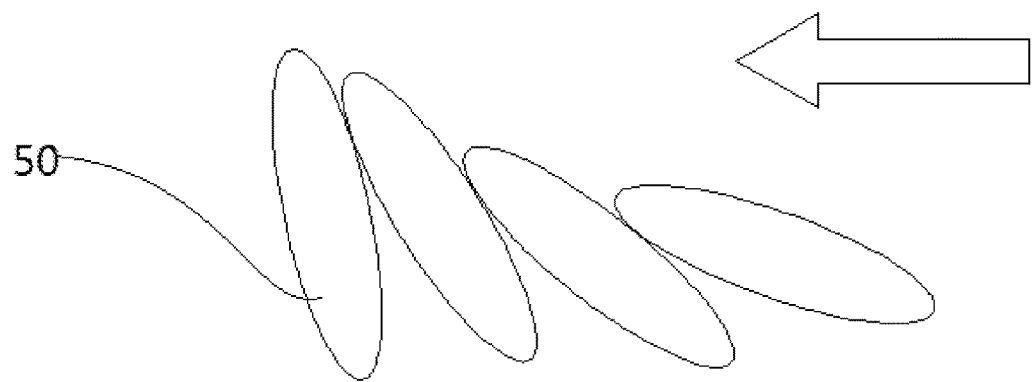
FIG. 6 is a principal view of liquid crystal rotation of a subpixel region of the liquid crystal panel with a switchable visual angle provided by the second embodiment of the disclosure.

FIG. 4 is a schematic structural view of a liquid crystal panel with a switchable visual angle provided by a second embodiment of the disclosure. As shown in the figure, the structure and operational principle of the main pixel region 10 are identical to those of the first embodiment, a difference is that the liquid crystal molecules 50 are negative liquid crystals, combined with FIG. 5, when the top visual angle electrode 202, the bottom visual angle electrode 204 and the accessary electrodes 206 are unloaded with a bias voltage, the liquid crystal molecules 50 of the sub pixel region 20 are vertical, backlight penetrates gaps among the liquid crystal molecules 50, the sub pixel region 20 leaks light, only the main pixel region 10 displays, the liquid crystal panel is on narrow visual angle display mode. After the top visual angle electrode 202, the bottom visual angle electrode 204 and the accessary electrodes 206 are loaded with the bias voltage, a tilt electric field emerges between the accessary electrodes 206, the two ends of the bottom visual angle electrode 204 and two ends of the top visual angle electrode 202. The liquid crystal molecules 50 on two sides of the sub pixel region 20 firstly rotate along a direction perpendicular to the tilt electric field line 64 to be horizontal affected by the tilt electric field, and the adjacent liquid crystal molecules 50 are spurred to rotate from the same end gradually in sequence to be horizontal. Finally all the liquid crystal molecules 50 are horizontal, perpendicular to a vertical electric field line 62. Combined with FIG. 6, liquid crystal molecules on right side of the sub pixel region 20 will be taken as an example, the liquid crystal molecules 50 on the outmost side rotate from vertical to be perpendicular to the tilt electric field line 64 counterclockwise affected by the tilt electric field, along with the influence of the vertical electric field, the adjacent liquid crystal molecules 50 are spurred to rotate from the same end gradually in sequence to be horizontal. When all the liquid crystal molecules 50 of the sub pixel region 20 are horizontal, the backlight penetrates gaps among the liquid crystal molecules 50 of the sub pixel region 20 to display an image, the sub pixel region 20 and the main pixel region 10 work simultaneously, the liquid crystal panel is on wide visual angle display mode.

As a polarity of the liquid crystal molecules 50 provided by the second embodiment is opposite to that by the first embodiment, positive liquid crystals rotate to be parallel the electric field line under the influence of the electric field, the negative liquid crystals rotate to be perpendicular to the electric field line under the influence of the electric field. Although operational modes of the two embodiments are opposite, the liquid crystal molecules 50 rotate by two ends influenced by the tilt electric field firstly to spur the adjacent liquid crystal molecules 50 to rotate from the same end gradually in sequence, disturbance of the liquid crystal molecules 50 can be prevented, and response time for switching angles can be reduced, symmetry of the visual angle after being switched can be improved.

A liquid crystal display includes a backlight module, a driving circuit and a liquid crystal panel with a switchable visual angle. The driving circuit controls the backlight module and the liquid crystal panel to operate. The driving circuit includes a first display driver and a second display driver. The first display driver controls voltages of the pixel electrodes 102 and the common electrodes 104 of the main pixel region 10, the second display driver controls voltages of the top visual angle electrode 202, the bottom visual angle electrode 204 and the accessary electrodes 206 of the sub pixel region 20. The first display driver controls to load a bias voltage on the pixel electrodes 102 and the common electrodes 104. The bias voltage stimulates the liquid crystal molecules 50 of the main pixel region 10 to rotate in a plane parallel the top substrate 30 and the bottom substrate 40 for controlling the main pixel region 10 to display an image by backlight. The second display driver controls to load a bias voltage on the top visual angle electrode 202, the bottom visual angle electrode 204 and the accessary electrodes 206. The liquid crystal molecules 50 of the sub pixel region 20 rotate in a plane perpendicular to the top substrate 30 and the bottom substrate 40 for the sub pixel region 20 to switch the wide angle display mode and the narrow angle display mode. As the sub pixel region 20 of the liquid crystal panel utilizes the tilt electric field to rotate the liquid crystal molecules 50 on two ends in order to spur the adjacent liquid crystal molecules 50 to rotate from the same end gradually in sequence, various requirements of the liquid crystal display can be fulfilled, and response time for switching angles can be reduced, symmetry of the visual angle is excellent.

Above are embodiments of the disclosure, which do not limit the scope of the disclosure, any modifications, equivalent replacements or improvements within the spirit and principles of the embodiments described above should be covered by the protected scope of the disclosure.

What is claimed is:

1. A liquid crystal panel with a switchable visual angle, comprising a top substrate and a bottom substrate disposed opposite, and a liquid crystal layer between the top substrate and the bottom substrate, a surface of the top substrate opposite to the bottom substrate has a top visual angle electrode, a surface of the bottom substrate opposite to the top substrate has a bottom visual angle electrode, wherein a length of the bottom visual angle electrode is shorter than a length of the top visual angle electrode, a center of the top visual angle electrode and a center of the bottom visual angle electrode are exactly opposite, the surface of the bottom substrate opposite to the top substrate further has two accessory electrodes corresponding to the top visual angle electrode, the two accessory electrodes are distributed on two sides of the bottom visual angle electrode symmetrically, the top visual angle electrode fully covers projections of the accessory electrodes on the top substrate, wherein the surface of the bottom substrate opposite to the top substrate further has pixel electrodes and common electrodes disposed alternately, and the pixel electrodes and the common electrodes directly face the surface of the top substrate without any electrode between the surface of the top substrate and the pixel electrodes and between the surface of the top substrate and the common electrodes, wherein a length of each of the two accessory electrodes is shorter than the length of the bottom visual angle electrode.

2. The liquid crystal panel with a switchable visual angle according to claim 1, wherein the pixel electrodes and the common electrodes are located at a side of the accessory electrodes away from the bottom visual angle electrode, a difference of the length of top visual angle electrode and the length of the bottom visual angle electrode is four times longer than a distance between one of the pixel electrodes and an adjacent common electrode.

3. The liquid crystal panel with a switchable visual angle according to claim 2, wherein a distance of the accessary electrodes and two ends of the bottom visual angle electrode is equal to the distance between one of the pixel electrodes and an adjacent common electrode.

4. The liquid crystal panel with a switchable visual angle according to claim 3, wherein shapes and sizes of the accessory electrodes, the pixel electrodes and the common electrodes are the same.

5. The liquid crystal panel with a switchable visual angle according to claim 4, wherein the pixel electrodes, the common electrodes, the top visual angle electrode, the bottom visual angle electrode and the accessary electrodes are made with transparent conductive material.

6. The liquid crystal panel with a switchable visual angle according to claim 2, wherein the liquid crystal molecules between the pixel electrodes and the common electrodes rotate in a plane paralleled the top substrate and the bottom substrate, the liquid crystal molecules between the top visual angle electrode and the bottom visual angle electrode, the accessary electrodes rotate in a plane perpendicular to the top substrate and the bottom substrate.

7. The liquid crystal panel with a switchable visual angle according to claim 2, wherein the liquid crystal molecules between the top visual angle electrode and the bottom visual angle electrode, the accessary electrodes are positive liquid crystals with originally horizontal arrangement during unloaded with a voltage.

8. The liquid crystal panel with a switchable visual angle according to claim 2, wherein the liquid crystal molecules between the top visual angle electrode and the bottom visual angle electrode, the accessary electrodes are negative liquid crystals with originally vertical arrangement during unloaded with a voltage.

9. A liquid crystal display, wherein the liquid crystal display comprises a backlight module, a driving circuit and a liquid crystal panel with a switchable visual angle, the driving circuit controls the backlight module and the liquid crystal panel to operate, the backlight module provides a backlight source to display an image by the liquid crystal panel, wherein the liquid crystal panel with a switchable visual angle comprises a top substrate and a bottom substrate disposed opposite, and a liquid crystal layer between the top substrate and the bottom substrate, a surface of the top substrate opposite to the bottom substrate has a top visual angle electrode, a surface of the bottom substrate opposite to the top substrate has a bottom visual angle electrode, wherein a length of the bottom visual angle electrode is shorter than a length of the top visual angle electrode, a center of the top visual angle electrode and a center of the bottom visual angle electrode are exactly opposite, the surface of the bottom substrate opposite to the top substrate further has two accessory electrodes corresponding to the top visual angle electrode, the two accessory electrodes are distributed on two sides of the bottom visual angle electrode symmetrically, the top visual angle electrode fully covers projections of the accessory electrodes on the top substrate, wherein the surface of the bottom substrate opposite to the top substrate further has pixel electrodes and common electrodes disposed alternately, and the pixel electrodes and the common electrodes directly face the surface of the top substrate without any electrode between the surface of the top substrate and the pixel electrodes and between the surface of the top substrate and the common electrodes, wherein a length of each of the two accessory electrodes is shorter than the length of the bottom visual angle electrode.

10. The liquid crystal display according to claim 9, wherein the pixel electrodes and the common electrodes are located at a side of the accessory electrodes away from the bottom visual angle electrode, a difference of the length of top visual angle electrode and the length of the bottom visual angle electrode is four times longer than a distance between one of the pixel electrodes and an adjacent common electrode.

11. The liquid crystal display according to claim 10, wherein a distance of the accessary electrodes and two ends of the bottom visual angle electrode is equal to the distance between one of the pixel electrodes and an adjacent common electrode.

12. The liquid crystal display according to claim 11, wherein shapes and sizes of the accessary electrodes, the pixel electrodes and the common electrodes are the same.

13. The liquid crystal display according to claim 12, wherein the pixel electrodes, the common electrodes, the top visual angle electrode, the bottom visual angle electrode and the accessary electrodes are made with transparent conductive material.

14. The liquid crystal display according to claim 9, wherein the liquid crystal molecules between the pixel electrodes and the common electrodes rotate in a plane paralleled the top substrate and the bottom substrate, the liquid crystal molecules between the top visual angle electrode and the bottom visual angle electrode, the accessary electrodes rotate in a plane perpendicular to the top substrate and the bottom substrate.

15. The liquid crystal display according to claim 9, wherein the liquid crystal molecules between the top visual angle electrode and the bottom visual angle electrode, the accessary electrodes are positive liquid crystals with originally horizontal arrangement during unloaded with a voltage.

16. The liquid crystal display according to claim 9, wherein the liquid crystal molecules between the top visual angle electrode and the bottom visual angle electrode, the accessary electrodes are negative liquid crystals with originally vertical arrangement during unloaded with a voltage.

17. The liquid crystal display according to claim 9, wherein the driving circuit comprises a first display driver and a second display driver, the first display driver controls voltages of the pixel electrodes and the common electrodes, the second display driver controls voltages of the top visual angle electrode, the bottom visual angle electrode and the accessary electrodes.

* * * * *